United States Patent [19]

Hatton et al.

[11] Patent Number: 5,451,345
[45] Date of Patent: Sep. 19, 1995

[54] CHEMICAL COMPOSITION

[75] Inventors: Kevin B. Hatton; David A. Taylor; Peter T. Chasseaud, all of Cambridge; Terence J. Smith, Royston, all of England

[73] Assignee: Ciba-Geigy Corporation, Ardsley, N.Y.

[21] Appl. No.: 129,701

[22] Filed: Sep. 30, 1993

[30] Foreign Application Priority Data

Oct. 6, 1992 [GB] United Kingdom ............... 9220986

[51] Int. Cl.$^6$ .................................................. C11D 7/22
[52] U.S. Cl. ................................................ 252/174.15
[58] Field of Search .............. 252/174.15; 427/487, 427/489, 515, 516

[56] References Cited

U.S. PATENT DOCUMENTS 4,101,513  7/1978  Fox et al. .
4,328,346  5/1982  Chung et al. .
4,486,504  12/1984  Chung .
5,080,824  1/1992  Bindl et al. ............... 252/174.15
5,318,713  6/1994  Binter ........................ 252/174.15 X

FOREIGN PATENT DOCUMENTS 0150482  8/1985  European Pat. Off. .
0332344  9/1989  European Pat. Off. .
3127976  4/1982  Germany .

OTHER PUBLICATIONS

Derwent Abst.–84–234459/38, 1984.
Derwent Abst. WPI Acc. No.:85–178415/30 for EP 150482, 1985.

Primary Examiner—Paul F. Shaver
Attorney, Agent, or Firm—Michele A. Kovaleski

[57] ABSTRACT

A composition for priming and cleaning glass, aluminium or steel surfaces which comprises a solution in an organic solvent, optionally mixed with water, of an organosilane and a compound which generates an acid on exposure to actinic radiation.

14 Claims, No Drawings

CHEMICAL COMPOSITION

The present invention relates to a composition for priming and cleaning glass, aluminium and steel surfaces to provide a surface with improved adhesion properties.

It is known from EP 0332344 that solutions containing p-toluenesulfonic acid and an organofunctional silane can be used to clean glass or painted surfaces in order to provide improved adhesion to subsequently applied urethane sealants. A disadvantage of such solutions is that they do not have long term stability and consequently cannot be stored for long periods.

We have now found that improved adhesion can be obtained by the use of a solution containing a silane and a compound which generates an acid on exposure to actinic irradiation.

Accordingly, the present invention provides a composition for priming and cleaning glass, aluminium and steel surfaces which comprises a solution in an organic solvent, optionally mixed with water, of an organosilane and a compound which generates an acid on exposure to actinic irradiation.

The organosilane may be a compound of the formula I $$R_nSi(OR^1)_m \qquad (I)$$

where R is an organic group which may be reactive or non-reactive, $R^1$ is alkyl, alkoxyalkyl or acyl, n is 1 or 2 and m is 2 or 3 such that n+m=4. Preferably n is 1 and m is 3.

Examples of organic groups R include alkyl, phenyl, vinyl, acrylatoalkyl, glycidyloxyalkyl and the like, where "alkyl" groups have 1 to 4 carbon atoms.

When $R^1$ is alkyl, it is preferably lower alkyl with I to 4 carbon atoms and most preferably methyl or ethyl. When $R^1$ is alkoxyalkyl, each alkyl moiety preferably has 1 to 4 carbon atoms. Most preferably as alkoxyalkyl $R^1$ is methoxyethyl. When $R^1$ is acyl it preferably has 2 to 4 carbon atoms, most preferably acetoxy.

Specific examples of suitable silanes are:

$CH_2=C(CH_3)COO(CH_2)_3Si(OCH_3)_3$

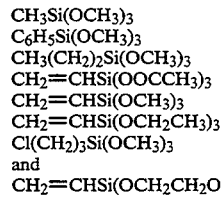
$CH_2\text{———}CHCH_2O(CH_2)_3Si(OCH_3)_3$ $CH_3Si(OCH_3)_3$
$C_6H_5Si(OCH_3)_3$
$CH_3(CH_2)_2Si(OCH_3)_3$
$CH_2=CHSi(OOCCH_3)_3$
$CH_2=CHSi(OCH_3)_3$
$CH_2=CHSi(OCH_2CH_3)_3$
$Cl(CH_2)_3Si(OCH_3)_3$
and
$CH_2=CHSi(OCH_2CH_2OCH_3)_3$ Any compound that generates an acid on exposure to actinic irradiation may be used in the compositions of the invention. The acid generated may be a Lewis acid or a Bronsted acid.

Suitable acid generating compounds include onium salts and iodosyl salts, aromatic diazonium salts, metallocenium salts, o-nitrobenzaldehyde, the polyoxymethylene polymers described in United States Patent No. 3 991 033, the o-nitrocarbinol esters described in U.S. Pat. No. 3,849,137, the o-nitrophenyl acetals, their polyesters, and end-capped derivatives described in United States Patent No. 4,086,210, sulphonate esters of aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253.

Suitable aromatic onium salts include those described in U.S. Pat. Nos. 4,058,400 and 4,058,401. Suitable aromatic sulphoxonium salts which can be used include those described in U.S. Pat. Nos. 4 299 938, 4,339,567, 4,383,025 and 4,398,014. Suitable aliphatic and cycloaliphatic sulphoxonium salts include those described in European Patent Publication No. EP-A-0164 314. Aromatic iodonium salts which can be used include those described in British Patent Specification Nos. 1,516,351 and 1,539,192. Aromatic iodosyl salts which can be used include those described in U.S. Pat. No. 4,518,676.

When the acid generating compound is an aromatic diazonium ion, the aromatic group may be unsubstituted or substituted by one or more arylthio, aryloxy, dialkylamino, nitro, alkyl or alkoxy groups.

When R is a metallocenium ion, the initiator may have the formula (IV)

$$[(R^6)(R^7M)_a]^{+an}\frac{an}{q}[LQ_m]^{-q} \qquad (IV)$$

wherein a is 1 or 2, each of n and q independently of the other is an integer from 1 to 3, M is the cation of a monovalent to trivalent metal from groups IVb to VIIb, VIII or Ib of the Periodic Table, L is a divalent to heptavalent metal or non metal, Q is a halogen atom or one of the groups Q may be a hydroxyl group, m is an integer corresponding to the valency of L+q, $R^6$ is a $R^7$ $\pi$-arene and $R^7$ is a $\pi$-arene or the anion of a $\pi$-arene.

Examples of sulphonate esters of aromatic alcohols containing a carbonyl group in a position alpha or beta to the sulphonate ester group and aromatic N-sulphonyloxyimides are those described in U.S. Pat. No. 4 618 564, preferably esters of benzoin or alpha-methylolbenzoin, especially benzoin phenyl sulphonate, benzoin-p-toluene sulphonate and 3-(p-toluenesulphonyloxy)-2-hydroxy-2-phenyl- 1-phenyl- 1-propanone, and N-sulphonyloxy derivatives of 1,8-naphthalimide, particularly N-benzenesulphonyloxy- and N-(p-dodecylbenzenesulphonyloxy)-1,8-naphthalimide.

Examples of aromatic oxime sulphonates are those described in European Patent Publication No. 0 199 672 or non-reactive derivatives of the reactive oxime sulphonates described in the cited publication. Particularly preferred oxime sulphonates are those of formula $$R^2-C(R^3)=N-O-SO_2-R^4 \qquad (II)$$

where one of $R^2$ and $R^3$ denotes a monovalent aromatic group, especially phenyl or 4-methoxyphenyl, while the other denotes cyano, or $R^2$ and $R^3$, together with the carbon atom to which they are attached, form a carbocyclic or heterocyclic group, especially a fluorene or anthrone ting system, and $R^4$ denotes an aliphatic, carbocyclic, heterocyclic or araliphatic group, especially 4-tolyl, 4-chlorophenyl or 4-dodecylphenyl.

The oxime sulphonates can be prepared as described in EP-A-0 199 672. The particularly preferred materials can be prepared by reacting an oxime of formula $R^2-C(R^3)=NOH$ with a sulphonyl chloride of formula $R^4SO_2Cl$, usually in an inert organic solvent in the presence of a tertiary amine.

Examples of quinone diazide compounds include o-benzoquinone diazide sulphonyl or o-naphthoquinone diazide sulphonyl esters or amides of compounds, particularly aromatic compounds, having a hydroxy group or amino group respectively. Preferred are o-quinone diazides such as o-benzoquinione diazide sulphonyl and o-naphthoquinone diazide sulphonyl esters of phenols, including monohydric phenols and, particularly, polyhydric phenols such as 2,2-bis(hydroxyphenyl)propanes, dihydroxydiphenyls, di- and tri-hydroxy-substituted benzophenones, and phenolic resins, including phenol-aldehyde resin and polymers of phenols having polymefisable unsaturated substituents.

Examples of o-nitrophenyl acetals are those prepared from an o-nitrobenzaldehyde and a dihydric alcohol, polyesters of such acetals prepared by reaction of the acetals with a polycarboxylic acid or reactive derivative thereof such as an anhydride, and end-capped derivatives of such acetals prepared by reacting the acetals with a carboxylic acid or reactive derivative thereof. Preferred are acetals derived from o-nitrobenzaldehyde and a linear alkylene glycol in which the alkylene group has 4 to 15 carbon atoms which may be interrupted by at least one oxygen atom, or a glycol containing a cycloaliphatic ting of 4 to 7 carbon atoms, such as cycloalkylene glycol or a cycloalkylenealkylene glycol, and polyester and end-capped derivatives of such acetals.

Preferred linear glycols from which the acetals may be derived are 1,4-butanediol, 1,5-pentanediol, 1,6-hexanediol, 1,7-heptanediol, diethylene and dipropylene glycols and triethylene and tripropylene glycols. Preferred glycols having a cycloaliphatic ring are 2,2,4,4-tetramethyl- 1,3-cyclobutanediol, bis(4-hydroxycyclohexyl)methane, 1,4-cyclohexanediol, 1,2-bis(hydroxymethyl)-cyclohexane and, especially, 1,4-bis(hydroxymethyl)cyclohexane.

Examples of polyesteracetals are those prepared by reaction of the preferred acetals described above with an aromatic dicarboxylic or tricarboxylic acid or anhydride thereof, such as phthalic, terephthalic, and trimellitic acids and their anhydrides, and mixtures of two or more thereof. An especially preferred polyesteracetal is that prepared by reacting an acetal derived from o-nitrobenzaldehyde and 1,4-bis(hydroxymethyl)cyclohexane with trimellitic anhydride. Preferred end-capped polyacetals are those prepared by reaction of the preferred acetals described above with a monobasic carboxylic acid or reactive derivative thereof, such as acetic and benzoic acids and their chlorides.

Suitable organic solvents include alcohols, esters, ethers, ketones and chlorinated hydrocarbons. Preferred alcohols are alkanols with 1 to 10 carbon atoms such as methanol, ethanol, propanol, hexanol and decanol. Preferred esters are $C_1$-$C_4$ alkyl esters of $C_1$-$C_4$ aliphatic carboxylic acids such as methyl acetate, ethyl acetate, butyl acetate and methyl propionate. Preferred ethers are dialkyl ethers such as diethyl ether, butoxyethanol and cyclic ethers such as tetrahydrofuran. Preferred chlorinated hydrocarbons are dichloromethane, 1,2-dichloroethane, and trichloroethane. Preferred ketones are lower aliphatic ketones such as acetone and methyl ethyl ketone. Mixtures of these solvents may be used if desired. The most preferred solvents are ketones, especially acetone. Water may also be added to suitable organic solvents as part of the formulation.

The compositions of the invention may contain from 1 to 25%, preferably from 5 to 15% by weight of the silane and 0.1 to 5% by weight of the acid generating compound, the percentages being based on the total weight of the composition. Preferred amounts are about 10% by weight of the silane and 0.1 to 1% by weight of the acid generating compound. The remainder may be solvent or a mixture of solvent and a film forming polymer, the polymer content being from 1 to 10% by weight of the total composition.

Any of the large number of film-forming resins may be used including acrylic resins; epoxide resins; adducts of epoxide resins with amines or polycarboxylic, amino or mercapto acids; polyurethanesa; polyesters; reaction products of phenolic hydroxyl group-containing resins with an aldehyde and amine or amino- or mercapto-carboxylic acids; and copolymers of olefines with other vinyl monomers.

Suitable acrylic resins include copolymers of at least one acrylic ester such as an alkyl or hydroxyalkyl acrylate or methacrylate with an ethylenically unsaturated monomer. Suitable epoxide resin adducts include those of diglycidyl ethers of dihydric alcohols or bisphenols with a stoichiometric excess of a primary or secondary monoamine or polyamine such as ethanolamine, diethanolamine or ethylenediamine, a polycarboxylic acid such as glutaric or adipic acid, a polycarboxylic acid anhydride such as maleic or succinic anhydride, an aminocarboxylic acid such as o-, m- or p- aminobenzoic acid or a mercaptocarboxylic acid. Suitable polyurethanes include adducts of hydroxyl-terminated polyurethanes with polycarboxylic acid anhydrides. Suitable polyesters include carboxyl-terminated polyesters derived from polyhydric alcohols such as ethylene glycol, 1,2-propylene glycol, 1,3-propylene glycol or butane-1,4-diol with polycarboxylic acids such as glutaric, adipic, maleic, tetrahydrophthalic and phthalic acids or esterifying derivatives thereof. Suitable reaction products of phenolic hydroxyl-containing resins include reaction products of phenol terminated adducts of diglycidyl ethers with bisphenols, aldehydes such as formaldehyde or benzaldehyde and amines such as ethanolamine, diethanolamine or ethylene diamine, aminocarboxylic acids such as glycine, sarcosine or asparfic acid, or mercaptocarboxylic acids such as thioglycolic or 3-mercaptopropionic acid. Suitable copolymers of olefines with other vinyl monomers are preferably copolymers from a $C_2$-$C_4$ straight or branched chain olefin, especially ethylene, and a polar monomer such as vinyl acetate or acrylic acid or an alkyl ester thereof. Preferred copolymers are ethylene/vinyl acetate, ethylene/ethyl acrylate and ethylene/vinyl acetate/acrylic acid terpolymers.

The compositions of the invention have good storage stability, especially if they are stored in a dark place.

The compositions of the invention are useful to treat a glass, aluminium or steel surface in order to provide improved adhesion to adhesives, especially but not limited to those which are cured by actinic radiation. Adhesives which are cured by heat may also be used.

Suitable adhesives may contain an acrylic ester, in particular a compound containing at least two groups of formula

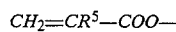  (III)

where $R^5$ represents a hydrogen or chlorine atom, or a methyl or ethyl group. Suitable adhesives may also include epoxides and polyurethanes.

Suitable esters having at least two groups of formula III include esters, especially acrylates and methacrylates, of aliphatic, cycloaliphatic, alicycloaliphafic, araliphatic or heterocycloaliphatic polyhydric alcohols, especially diols and triols; polyhydroxy-, particularly dihydroxy-, carboxylic acids; polyhydroxy-, particularly dihydroxy-, alkylamines; and polyhydroxy-, particularly dihydroxy-, alkylnitriles. Acrylic ester-urethanes and -ureides may also be used. Such esters are, in general, commercially available, and any that are not may be prepared by known methods.

Suitable epoxides include polyglycidyl esters, polyglycidyl ethers, polyglycidyl amines, cycloaliphatic epoxides and epoxy novolaks.

Epoxides which may be employed are preferably those containing at least two groups of formula

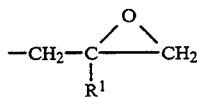

directly attached to an atom or atoms of oxygen or nitrogen, where $R^1$ denotes a hydrogen atom or a methyl group.

If desired, a mixture of epoxide resins may be used.

Preferred epoxides are polyglycidyl esters, polyglycidyl ethers of 2,2-bis(4-hydroxyphenyl)propane, of bis(4-hydroxyphenyl)-methane, of butane-1,4-diol, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, p-(diglycidylamino)-phenyl glycidyl ether and 3,4-epoxycyclohexylmethyl 3',4'-epoxycyclohexane carboxylate.

Suitable polyurethane adhesives are those which contain an isocyanate group and especially compounds containing at least two groups of formula Such compounds include aliphatic and aromatic diisocyanates, as well as adducts of such compounds which contain biuret, allophanate, urea, urethane, carbodiimide or uretdione groups or isocyanurate rings. The adhesives may also contain fillers. The compounds may be used to formulate two types of unblocked polyurethane adhesives:- (a) one pot moisture curable systems which can also contain an accelerator, or (b) two part systems where cure occurs on reaction with multifunctional active hydrogen compounds such as multifunctional alcohols or amines. Polyurethane adhesives which contain a heat deblockable group may also be used such as phenolic blocked isocyanates.

In order to improve the adhesive properties of a glass surface the composition of the invention may be simply applied to the surface, irradiated with actinic radiation and dried. Alternatively the composition may be applied to the surface and dried, and then irradiated at the same time as an applied adhesive.

Suitable sources of actinic radiation both for the composition of the invention and the adhesive include carbon arcs, mercury vapour arcs, fluorescent lamps with phosphors emitting ultraviolet light, argon and xenon glow lamps, tungsten lamps, and photographic flood lamps.

The invention is illustrated by the following Examples.

1 Gram of silane S, and p1 grams of photogenerating acid compound $P_1$ are dissolved in 10 g of organic solvent $D_1$ to give a primer solution of the invention. The ingredients and quantities are shown in Table 1 with the abbreviations given below.

TABLE 1

| Example | $P_1$ | $p_1$ | $S_1$ | $D_1$ |
|---|---|---|---|---|
| 1 | CG 21-746 | .01 | TMSPMA | Acetone |
| 2 | CG 21-746 | .01 | VTMS | Acetone |
| 3 | $Ph_2I^+=O\ PF_6^{(-)}$ | .01 | TMSPMA | Acetone |
| 4 | Du 890002 | .01 | TMSPMA | Acetone |
| 5 | $Ph_3S^+PF_6^-$ | .01 | TMSPMA | Acetone |
| 6 | CG 21-206 | .01 | TMSPMA | Acetone |
| 7 | Du 890002 | 0.01 | TMSPMA | Ethanol |
| 8 | PB 2337 | .01 | TMSPMA | Acetone |
| 9 | I 261 | .01 | TMSPMA | Acetone |
| 10 | PB 2337 | .01 | TMPS | Acetone |
| 11 | CG 21-746 | 0.1 | TMSPMA | Acetone |
| 12 | UVE 1014 | 0.1 | TMSPMA | Acetone |
| 13 | $Ph_2I^+=O\ PF_6^{(-)}$ | 0.1 | TMSPMA | Acetone |
| 14 | Du 890002 | 0.1 | TMSPMA | Acetone |
| 15 | PB 2337 | 0.1 | TMSPMA | Acetone |
| 16 | I 261 | 0.1 | TMSPMA | Acetone |
| 17 | NBNT | 0.1 | TMSPMA | Acetone |
| 18 | PB 2337 | 0.1 | VTMS | Acetone |
| 19 | PB 2337 | 0.1 | TMPS | Acetone |
| 20 | I 261 | 0.1 | VTMS | Acetone |
| 21 | I 261 | 0.1 | TMPS | Acetone |
| 22 | PB 2337 | 0.1 | TMSPMA | Ethanol |
| 23 | PB 2337 | 0.1 | TMSPMA | Ethyl acetate |
| 24 | PB 2337 | 0.1 | TMSPMA | Tetrahydrofuran |
| 25 | NBNT | 0.1 | TMSPMA | Acetone |
| 26 | KI 85 | 0.2 | A 187 | Acetone |
| 27 | KI 85 | 0.2 | TMPS | Acetone |
| 28 | PB 2337 | 0.2 | A 187 | Acetone (70%) + Water (30%) |

Polymer Containing Primer Solutions

1 Gram of Silane S, p1 grams. of photogenerating acid compound $P_1$, and 0.5 grams. of film forming polymer $F_1$ are dissolved in 10 grams. of Organic solvent $D_1$ to give primer solutions of the invention. The ingredients and quantities are shown in Table 1.1 with the abbreviations given below.
TABLE 1.1
| Example | P₁ | p1 | S₁ | F₁ | D₁ |
|---|---|---|---|---|---|
| 29 | KI 85 | 0.2 | A 187 | GT 6100 | Acetone |
| 30 | KI 85 | 0.2 | A 187 | Elvax 140W | Ethyl acetate |
Abbreviations in Tables 1 and 1.1
CG 21-746:
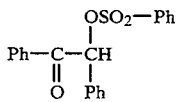
Du 890002:
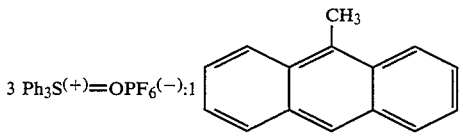
CG 21-206:
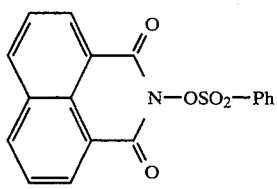
PB 2337:
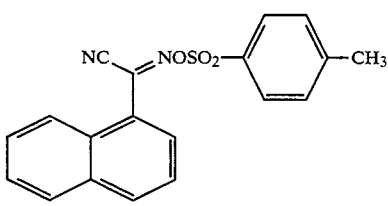
I 261:
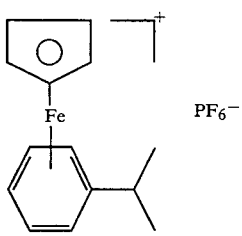
KI 85:
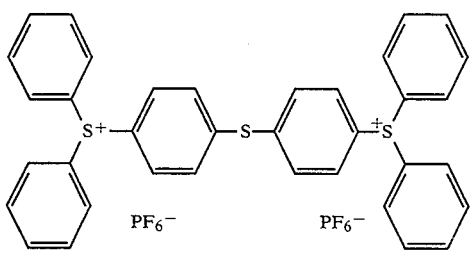
NBNT:
4-Nitrobenzene diazonium tetrafluoroborate.
TMSPMA:
Trimethoxysilylpropyl methacrylate.

-continued

VTMS:
Vinyl trimethoxysilane.

TMPS:
Trimethoxypropylsilane.

A 187:
Trimethoxysilyl propyl glycidyl ether.

GT 6100:

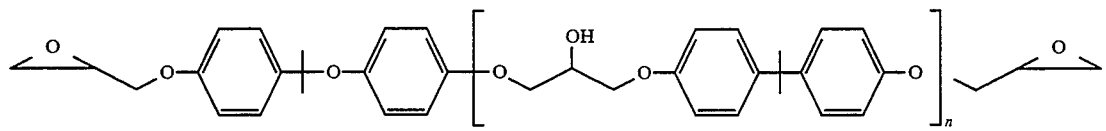

where > 1 and Epoxide Content = 2 mol./Kg.

ELVAX 140w
Ethylene-vinyl acetate copolymer with a vinyl acetate content of 33% supplied by Du pont.

The primer solutions are tested by the methods described below using three different adhesives:

U.V. Curable Adhesive A 1

0.1 g Irgacure 184 is dissolved in a mixture of 1 g hydroxyethyl acrylate and 0.7 g hexane-1,6-diol diacrylate to give a U.V. curable adhesive A1.

U.V. Curable Adhesive A2

The windscreen repair adhesive supplied by Glass Medic was used as U.V. curable adhesive A2.

U.V. Curable Adhesive A3

The windscreen repair adhesive supplied by Novus was used as U.V. curable adhesive A3.

Polyurethane Adhesive A4

| XF 543 | 8 g |
| XB 5304 | 4 g |
| Ballotini 2042 | 0.1 g |

(XF 543 and XB 5304 are the parts of a two component polyurethane system supplied by Ciba Polymers)

Epoxy Adhesive A5

| Araldite 2005A | 10 g |
| Araldite 2005B | 4.4" g |
| Ballontini 2042 | 0.2 g |

(Araldite 2005 A/B are a two component epoxy adhesive supplied by Ciba Polymers)
(Ballontini 2042 is a glass microsphere of diameter 0.1 mm)

Testing of Primer Solutions General Method 1
(Lap-Shear)

A piece of window glass 50×25×2 mm is bonded to a piece of aluminium 1130×25×2 mm using Araldite 2001.

The aluminium bonded glass and an identical piece of glass are cleaned by one of the two methods outlined below using the primer solution indicated in Table 2:

1) The glass is cleaned using the primer solution soaked onto a cotton wool pad. The cleaned glass is placed 75 cm under a Staub 5000w lamp and irradiated using a Mo61 bulb for 30 seconds.

2) The glass is cleaned using the primer solution soaked onto a cotton wool pad.

The U.V. curable adhesive (A1, A2 or A3) is then applied and the two, primed glass pieces placed in contact to give a joint of either 5 mm or 10 mm overlap. The glass is held in place and irradiated under the Staub 5000w U.V. lamp for 60 seconds to give glass-glass bonded joint. Another piece of aluminium (100×50×2 mm) is bonded to the second piece of glass using Araldite 2001 and the lap-sheer test piece left undisturbed for at least 12 hours.

The above procedure is performed in triplicate and the three test pieces pulled apart on a Lloyd MX50 Tensiometer at 10 mm min$^{-1}$ (23° C.) to give an averaged glass-glass lap sheer result, as shown in Table 2.

TABLE 2

| Primer of Example No. | Adhesive | Cleaning | Overlap (mm) | Lap Shear (N/mm$^2$) |
|---|---|---|---|---|
| — | A1 | — | 10 | 4.4 |
| — | A2 | — | 10 | 4.0 |
| — | A2 | — | 5 | 6.9 |
| — | A3 | — | 10 | 1.4 |
| 1 | A1 | 1 | 10 | 7.1 |
| 1 | A1 | 2 | 10 | 5.6 |
| 1 | A3 | 1 | 10 | 3.1 |
| 2 | A1 | 1 | 10 | 5.1 |
| 2 | A1 | 2 | 10 | 5.0 |
| 3 | A3 | 1 | 10 | 2.8 |
| 4 | A1 | 1 | 10 | 5.7 |
| 4 | A2 | 1 | 10 | 5.0 |
| 4 | A2 | 1 | 5 | 8.8 |
| 4 | A3 | 1 | 10 | 3.2 |
| 5 | A3 | 1 | 10 | 2.6 |
| 6 | A2 | 1 | 5 | 8.8 |
| 6 | A3 | 1 | 10 | 4.4 |
| 7 | A2 | 1 | 10 | 5.0 |
| 8 | A2 | 1 | 5 | 9.5 |
| 9 | A2 | 1 | 5 | 10.4 |
| 10 | A2 | 1 | 5 | 10.7 |
| 25 | A2 | 1 | 5 | 8.6 |

Testing of Primer Solutions General Method 2
(Twist-o-Meter)

A piece of window glass 100×50×3 mm is cleaned using the primer solution indicated in Table 3 soaked onto a cotton wool pad. The cleaned glass is placed 75 cm under a Staub 5000w U.V. lamp and irradiated using an MO61 bulb for 30 seconds. The oxidised surface of three circular aluminium test pieces 150 mm diameter with a 60 mm diameter hole in the middle have U.V. curable adhesive (A2) applied to them are brought in contact with the primed glass using a holder to give a bond line of 0.2 mm. The samples are irradiated under a 5000w Staub U.V. lamp for 60 seconds. The test pieces are twisted off the primed glass surface using the Epprecht Twist-o-meter at a test speed of 1 revolution every 25 minutes to give an averaged result in N/mm$^2$ of the force required to remove the test pieces from the glass.

TABLE 3

| Primer of Example No. | Result (N/mm$^2$) | Mode of Failure |
|---|---|---|
| — | 23.0 | Ad./GL. |
| 11 | 29.5 | Ad./GL. + Ad./AL. |
| 12 | 33.0 | Ad./AL. |
| 13 | 28.5 | Ad./AL. + Ad./GL. |
| 14 | 31.5 | Ad./AL. |
| 15 | 33.5 | Ad./GL. + Ad./AL. |
| 16 | 34.5 | Ad./AL. |
| 17 | 37.0 | Ad./AL. |
| 18 | 35.5 | Ad./GL. |
| 19 | 32.5 | Ad./GL. |
| 20 | 28.5 | Ad./GL. |
| 21 | 30.5 | Ad./GL. |
| 22 | 37.5 | Ad./AL. |
| 23 | 40.0 | Ad./AL. |
| 24 | 34.5 | Ad./GL. + Ad./AL. |
| 8 | 31.0 | Ad./AL. |

Ad./GL = Failure at the adhesive/glass interface.
Ad./AL = Failure at the adhesive/aluminium interface.

Testing of Primer Solutions General Method 4 (T-Peel)

A piece of L 61 aluminium 135×25×0.6 mm is immersed in trichloroethylene vapour and then placed in a chromic acid etch bath of concentration 60 gl$^{-1}$ for 20 mins. The aluminium is then cleaned using either acetone or the primer solution indicated in Table 5 soaked onto a cotton wool pad. The cleaned aluminium is placed 75 cm from a 5000w U.V. lamp and irradiated using a MO 61 bulb for 2 mins. Two treated pieces of aluminium are coated with Adhesive A5 and brought together to give an overlap of 135 mm. The joints are then cured in an oven at 60° C. for 20 mins., then allowed to stand at room temperature for 72 hours.

The above procedure is performed in triplicate and the test pieces peeled apart on a Lloyd MX 50 Tensiometer at 100mm min$^{-1}$ to give an average aluminium T-peel result as shown in Table 5.

TABLE 5

| Primer of Example | Result (N/mm$^2$) | Mode of Failure |
|---|---|---|
| Acetone | 1.4 | Ad. |
| 26 | 3.5 | Ad. |
| 28 | 3.7 | Ad. |
| 29 | 5.0 | Ad. |
| 30 | 2.5 | Ad. |

Ad. = Adhesive
Co. = Cohesive

We claim:

1. A composition for priming and cleaning glass, aluminum or steel surfaces, which composition comprises a solution in an organic solvent, which may be mixed with water, of a) 1 to 25% by weight of the total composition of an organosilane of formula I $$R_nSi(OR^1)_m \qquad (I)$$

wherein R is an organic group which is reactive or non-reactive, $R^1$ is alkyl, alkoxyalkyl or acyl, n is 1 or 2 and m is 2 or 3 such that n+m is 4; and b) 0.1 to 5% by weight of the total composition of a compound which generates an acid on exposure to actinic radiation.

2. A composition as claimed in claim 1 in which n is 1 and m is 3.

3. A composition as claimed in claim 2 in which R is alkyl, phenyl, vinyl, acrylatoalkyl or glycidyloxyalkyl, where alkyl groups have 1 to 4 carbon atoms.

4. A composition as claimed in claim 1 in which $R^1$ is methyl, ethyl, methoxyethyl or acetoxy.

5. A composition as claimed in claim 1 in which the acid generating compound is selected from onium salts, iodosyl salts, aromatic diazonium salts, metallocenium salts, sulphonate esters of aromatic alcohols containing a carbonyl group in a position alpha or beta to the sulphonate ester group, N-sulphonyloxy derivatives of an aromatic amid. or imide, aromatic oxime sulphonates, and quintone diazides.

6. A composition as claimed in claim 1 in which the organic solvent is selected from the group consisting of an alcohol, ester, ether, chlorinated hydrocarbon and ketone.

7. A composition as claimed in claim 1 which contains about 10% by weight of the silane and 0.1 to 1% by weight of the acid generating compound.

8. A composition as claimed in claim 1 which also contains a film-forming polymer.

9. A composition as claimed in claim 10 which contains from 1 to 10% by weight of the total composition of a film-forming polymer.

10. A composition as claimed in claim 8 in which the film-forming polymer is selected from the group consisting of acrylic resins; epoxide resins; adducts of epoxide resins with amines or polycarboxylic, amino or mercapto acids; polyurethanes; polyesters; reaction products of phenolic hydroxyl group-containing resins with an aldehyde and amine or amino or mercapto-carboxylic acids; and copolymers of olefines with other vinyl monomers.

11. A method of improving the adhesive properties of a glass, aluminium or steel surface which comprises applying to the surface a composition as claimed in claim 1, irradiating with actinic radiation and drying.

12. A method for improving the adhesive properties of a glass surface which comprises applying to the surface a composition as claimed in claim 1, drying, and irradiating with actinic radiation at the same time as an applied adhesive.

13. A process for bonding a glass, aluminum or steel surface which comprises applying to the surface a composition as claimed in claim 1, irradiating with actinic radiation, drying and then bonding the resultant surface to a second surface by applying an adhesive between the surfaces to be bonded.

14. A process for bonding a glass surface which comprises applying to the surface a composition as claimed in claim 1, drying, applying an adhesive between the resultant surface and a second surface, and irradiating with actinic radiation at the same time.

* * * * *